United States Patent
Takada (10) Patent No.: US 11,206,220 B2
(45) Date of Patent: Dec. 21, 2021

(54) COMMUNICATION APPARATUS, CONTROL METHOD, AND STORAGE MEDIUM

(71) Applicant: CANON KABUSHIKI KAISHA, Tokyo (JP)

(72) Inventor: Tomoyuki Takada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 3 days.

(21) Appl. No.: 16/668,938

(22) Filed: Oct. 30, 2019

(65) Prior Publication Data

US 2020/0153747 A1     May 14, 2020

(30) Foreign Application Priority Data

Nov. 8, 2018  (JP) .............................. JP2018-210839

(51) Int. Cl.
| | |
|---|---|
| *H04L 12/863* | (2013.01) |
| *G06F 9/54* | (2006.01) |
| *H04L 12/875* | (2013.01) |
| *H04L 12/835* | (2013.01) |
| *H04L 12/873* | (2013.01) |

(52) U.S. Cl.
CPC .......... *H04L 47/6215* (2013.01); *G06F 9/546* (2013.01); *H04L 47/30* (2013.01); *H04L 47/522* (2013.01); *H04L 47/56* (2013.01); *H04L 47/6255* (2013.01)

(58) Field of Classification Search
CPC ..... H04L 47/6215; H04L 47/56; H04L 47/30; H04L 47/6255; G06F 9/546
See application file for complete search history.

(56) References Cited

U.S. PATENT DOCUMENTS

| | | | |
|---|---|---|---|
| 2018/0255514 A1 | 9/2018 | Yanjun | |
| 2019/0028967 A1* | 1/2019 | Ahn | ......................... H04B 7/02 |
| 2020/0120607 A1* | 4/2020 | Kim | ..................... H04W 52/02 |
| 2020/0280920 A1* | 9/2020 | Huang | .................. H04W 76/28 |

* cited by examiner

*Primary Examiner* — Fahmida S Chowdhury
(74) *Attorney, Agent, or Firm* — Canon U.S.A., Inc. IP Division (57) ABSTRACT

If a communication apparatus is to transmit data to another communication apparatus and communication via a communication unit included in the other communication apparatus is not performable, whether or not to transmit a frame for causing a transition to a state where the communication via the communication unit included in the other communication apparatus is performable is selected based on an amount of data accumulated in a transmission queue in which the data is stored.

11 Claims, 6 Drawing Sheets

| AC | APERIODIC TRANSMISSION OF WUR WAKE-UP FRAMES | PREDETERMINED AMOUNT OF ACCUMULATED BU'S (Byte) |
|---|---|---|
| AC_VO | PERMITTED | 0 |
| AC_VI | PERMITTED | 0 |
| AC_BE | PERMITTED | 64 k |
| AC_BK | PERMITTED | 128 k |

FIG.5

| AC | APERIODIC TRANSMISSION OF WUR WAKE-UP FRAMES | PREDETERMINED AMOUNT OF ACCUMULATED BU'S (Byte) |
|---|---|---|
| AC_VO | PERMITTED | 0 |
| AC_VI | PERMITTED | 64 k |
| AC_BE | NOT PERMITTED | NOT APPLICABLE |
| AC_BK | NOT PERMITTED | NOT APPLICABLE |

FIG.6

COMMUNICATION APPARATUS, CONTROL METHOD, AND STORAGE MEDIUM

BACKGROUND

Field of the Disclosure

The present disclosure relates to a power saving technique for wireless communication.

Description of the Related Art

Devices incorporating a wireless communication function are becoming more and more diversified, and implementation of wireless communication with reduced power is being demanded of battery-driven Internet of Things (IoT) devices and built-in devices in particular. The Institute of Electrical and Electronics Engineers (IEEE) is conducting study for the IEEE 802.11ba standard for performing wireless communication with reduced power. According to the IEEE 802.11ba standard, a wake-up radio (WUR) is provided aside from a primary connectivity radio (PCR) that is a conventional radio frequency (RF) circuit. The WUR is a circuit that can operate with lower power consumption than the PCR. A communication apparatus compliant with the IEEE 802.11ba standard can operate with reduced power by bringing its PCR into a doze state when not performing PCR based communication. The IEEE 802.11ba defines a WUR access point (AP) that operates as an AP and a WUR non-AP station (STA) that operates as a non-AP STA.

United States Patent Application Publication No. 2018/0255514 discusses a communication apparatus related to the IEEE 802.11ba. According to the discussion, a WUR AP transmits a WUR wake-up frame to a WUR non-AP STA if there is data to be transmitted via a PCR.

Suppose that a WUR AP includes a plurality of WUR non-AP STAs in its basic service set (BSS). In such a case, the communication band becomes tight if a WUR wake-up frame is transmitted each time a bufferable unit (BU) is received.

SUMMARY

Some embodiments are directed to improving use efficiency of the communication band.

According to some embodiments, a communication apparatus includes a first communication unit compliant with an Institute of Electrical and Electronics Engineers (IEEE) 802.11 series standard, a second communication unit compliant with the IEEE 802.11 series standard, the second communication unit having power consumption lower than that of the first communication unit, a storage unit configured to store, in a first transmission queue, data to be transmitted to another communication apparatus via the first communication unit, a selection unit configured to, in a case where the data stored by the storage unit is to be transmitted to another communication apparatus including a third communication unit and a fourth communication unit via the first communication unit, select whether to transmit a frame for causing a transition to a state where communication is performable via the third communication unit, based on an amount of data accumulated in the first transmission queue in which the data is stored by the storage unit, the third communication unit compliant with the IEEE 802.11 series standard, and the fourth communication unit compliant with the IEEE 802.11 series standard and having power consumption lower than that of the third communication unit, and a first transmission unit configured to transmit the frame for causing the transition to the state where communication is performable via the third communication unit to the other communication apparatus via the second communication unit based on a selection made by the selection unit.

Further features of various embodiments will become apparent from the following description of exemplary embodiments with reference to the attached drawings.

DESCRIPTION OF THE EMBODIMENTS

Exemplary embodiments will be described in detail below with reference to the drawings. Configurations described in the following exemplary embodiments are merely examples, and some embodiments are not limited to the illustrated configurations.

Figure 1:
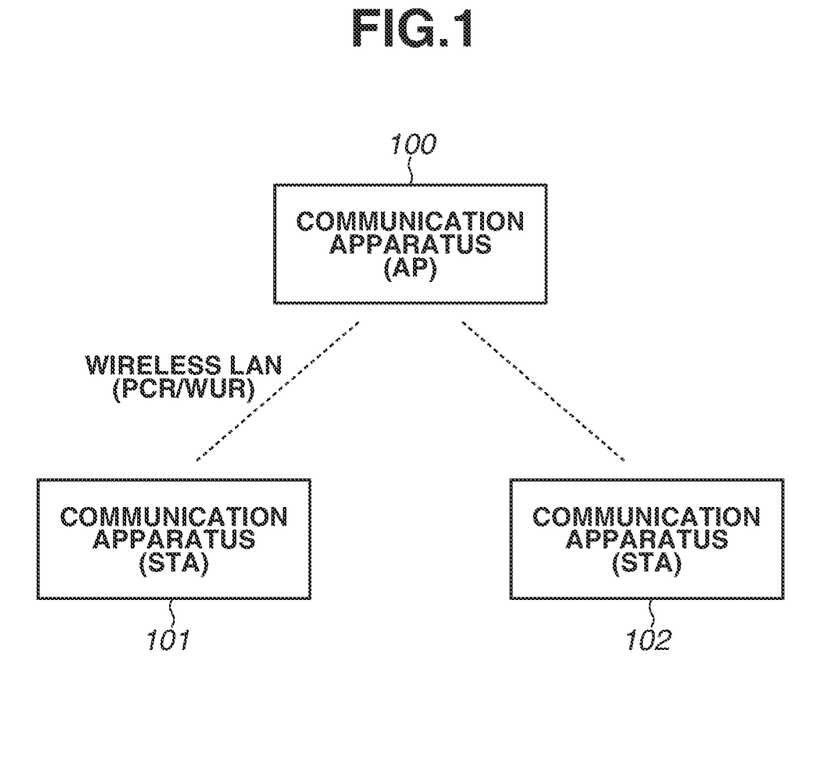
FIG. 1 is a diagram illustrating a network configuration of a communication system in which a communication apparatus 100 participates.

FIG. 1 illustrates a network configuration of a communication system in which a communication apparatus 100 according to an exemplary embodiment participates. The communication system includes the communication apparatus 100 and communication apparatuses 101 and 102. The communication apparatuses 100, 101, and 102 perform wireless communication over an infrastructure network compliant with the Institute of Electrical and Electronics Engineers (IEEE) 802.11 series standard. The communication apparatuses 101 and 102 are included in a basic service set (BSS) managed by the communication apparatus 100.

The communication apparatus 100 serves as a wireless local area network (LAN) access point functioning as a wake-up radio access point (WUR AP) defined in the IEEE 802.11ba standard. The communication apparatuses 101 and 102 are wireless LAN terminals functioning as WUR non-AP stations (WUR non-AP STAs) defined in the IEEE 802.11ba standard. A communication apparatus compliant with the IEEE 802.11ba standard includes a WUR aside from a primary connectivity ratio (PCR) that is a conventional radio frequency (RF) circuit. The WUR is a circuit that can operate with lower power consumption than that of the PCR. The communication apparatus compliant with the IEEE 802.11ba standard can operate with reduced power by bringing its PCR into a doze state when not performing PCR based communication. That the PCR is in the doze state refers to that the PCR is not supplied with sufficient power or not powered at all, and communication via the PCR is unable to be performed. That the PCR is not in the doze state but in an awake state refers to the state where the PCR is supplied with sufficient power and communication via the PCR can be performed. A difference between the reception coverage of a PCR signal that the WUR AP transmits and that of a WUR signal can be small. However, this is not restrictive.

A WUR non-AP STA can enter a WUR mode by transmitting a request for a start of operation in the WUR mode to the WUR AP, and receiving a response indicating acceptance from the WUR AP. While operating in the WUR mode, the WUR non-AP STA can maintain the PCR in the doze state. While operating in the WUR mode, the WUR non-AP STA maintains the WUR in the awake state so that a WUR wake-up frame transmitted from the WUR AP can be received. Receiving the WUR wake-up frame, the WUR non-AT STA makes the PCR of the own apparatus transition to the awake state.

By negotiating a schedule with the WUR AP in advance, the WUR non-AP STA can also make the WUR transition to the doze state when operating in the WUR mode. The WUR non-AP STA determines a period in which the WUR non-AP STA keeps the WUR in the awake state (WUR duty cycle schedule period) by negotiation with the WUR AP. In a period other than the WUR duty cycle schedule period, the WUR non-AP STA may bring not only the PCR but also the WUR into the doze state. The WUR duty cycle schedule period is a period that comes at predetermined intervals. During the WUR duty cycle schedule period, the WUR non-AP STA keeps the WUR in the awake state. That the WUR is in the doze state refers to that the WUR is not supplied with sufficient power or not powered at all and communication via the WUR is unable to be performed. That the WUR is not in the doze state but in the awake state refers to the state where the WUR is supplied with sufficient power and communication via the WUR can be performed.

If the WUR AP receives a bufferable unit (BU) that is a data unit compliant with the IEEE 802.11 series standard, the WUR AP transmits a WUR wake-up frame to the WUR non-AP STA for which the BU is destined. The WUR AP includes queues for storing BUs. The WUR AP according to the present exemplary embodiment can improve use efficiency of the communication band by appropriately transmitting a WUR wake-up frame based on the amount of BUs accumulated in a queue in which the received BU is stored, compared to the case where a WUR wake-up frame is transmitted to the destination STA each time a BU is received. By transmitting the WUR wake-up frame, the WUR AP can inform the WUR non-AP STA that the BU can be received via the PCR. The WUR non-AP STA having received the WUR wake-up frame can receive the BU from the WUR AP by transitioning the PCR from the doze state to the awake state.

Specific examples of the communication apparatuses 100, 101, and 102 include, but are not limited to, a camera, a tablet, a smartphone, a personal computer (PC), a mobile phone, and a video camera. The communication apparatuses 100, 101, and 102 may be communication apparatuses that each include two or more different types of RF circuits having different power consumptions and can bring an RF circuit having high power consumption into a doze state when not performing communication via the RF circuit having high power consumption. The communication apparatuses 101 and 102 may be communication apparatuses that can make an RF circuit having high power consumption transition to the awake state based on a frame received from the communication apparatus 100 via an RF circuit having low power consumption. While the communication system illustrated in FIG. 1 includes three communication apparatuses, the communication system may include two communication apparatuses or four or more communication apparatuses.

In the present exemplary embodiment, the communication apparatuses 100, 101, and 102 illustrated in FIG. 1 perform wireless communication compliant with the IEEE 802.11 series standard. In addition, the communication apparatuses 100, 101, and 102 may use wireless communications compliant with other communication methods, such as Bluetooth®, near field communication (NFC), Ultra Wide Band (UWB), ZigBee, and Multi Band OFDM (orthogonal frequency division multiplexing) Alliance (MBOA). UWB includes Wireless Universal Serial Bus (USB), Wireless 1394, and WiNET. Communication methods compliant with wired communication methods, such as a wired LAN, may be used.

Figure 2:
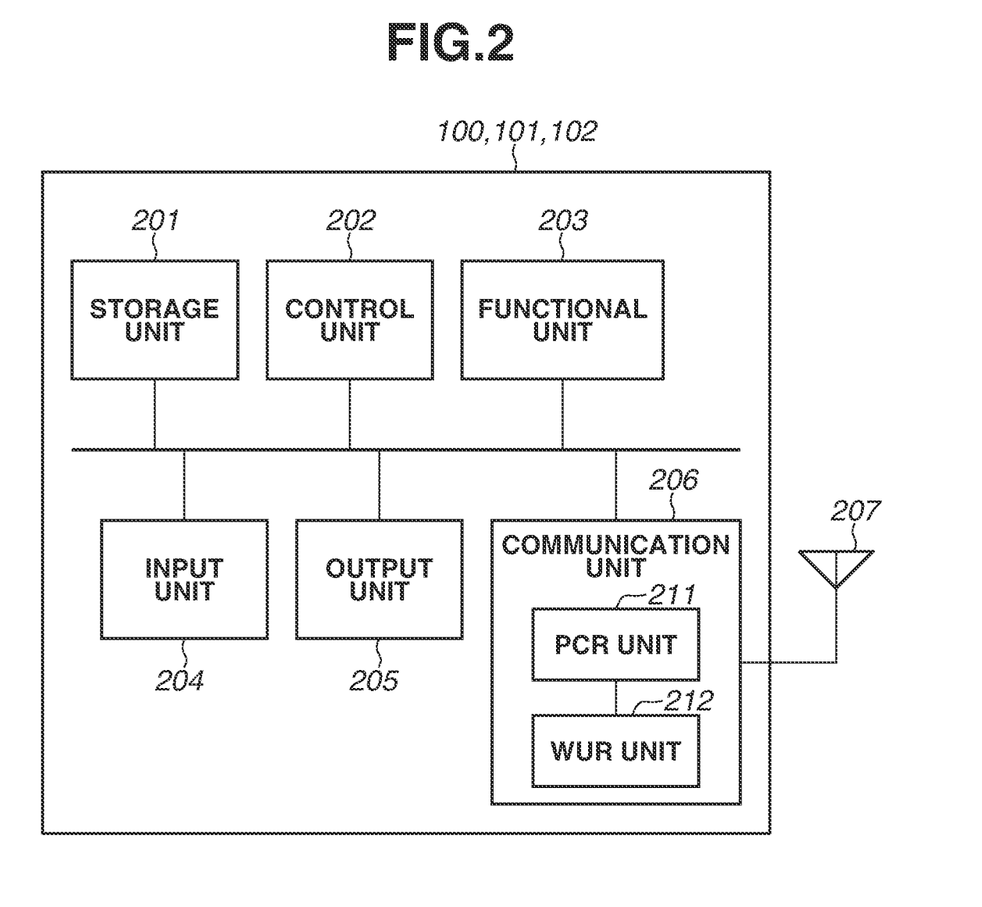
FIG. 2 is a diagram illustrating a hardware configuration of the communication apparatus 100.

FIG. 2 is a diagram illustrating a hardware configuration of the communication apparatus 100.

The communication apparatus 100 includes a storage unit 201, a control unit 202, a functional unit 203, an input unit 204, an output unit 205, a communication unit 206, an antenna 207, a PCR unit 211, and a WUR unit 212.

The storage unit 201 includes one or more memories, such as a read-only memory (ROM) and a random access memory (RAM). The storage unit 201 stores computer programs for performing various operations (described below) and various types of information, such as communication parameters for wireless communication. Aside from memories, such as a ROM and a RAM, storage media such as a flexible disk, a hard disk, an optical disc, a magneto-optical disc, a Compact Disc Read-Only Memory (CD-ROM), a Compact Disc Recordable (CD-R), a magnetic tape, a nonvolatile memory card, and a digital versatile disk (DVD) may be used as the storage unit 201. The storage unit 201 may include a plurality of memories.

The control unit 202 includes one or more processors, such as a central processing unit (CPU) and a microprocessing unit (MPU), which function(s) as a computer. The control unit 202 controls the entire communication apparatus 100 by executing the computer programs stored in the storage unit 201. The control unit 202 may control the entire communication apparatus 100 through cooperation of the computer programs stored in the storage unit 201 and an operating system (OS). The control unit 202 may include a plurality of processors, such as a multicore processor, and control the entire communication apparatus 100 by using the plurality of processors.

The control unit 202 controls the functional unit 203 to perform predetermined processing, such as imaging, printing, and projection. The functional unit 203 is hardware for the communication apparatus 100 to perform predetermined processing. For example, if the communication apparatus 100 is a camera, the functional unit 203 is an imaging unit and performs imaging processing. For example, if the communication apparatus 100 is a printer, the functional unit 203 is a printing unit and performs print processing. For example, if the communication apparatus 100 is a projector, the functional unit 203 is a projection unit and performs projection processing. Data for the functional unit 203 to process may be stored in the storage unit 201 or obtained by communication with another communication apparatus via the communication unit 206 (described below).

The input unit 204 accepts various operations from a user. The output unit 205 makes various outputs to the user via a monitor screen and/or a speaker. Examples of the output made by the output unit 205 may include display on the monitor screen, sound output from the speaker, and vibration output. The monitor screen to which the output unit 205 makes an output may be a monitor screen of the communication apparatus 100. The monitor screen to which the output unit 205 makes an output may be a monitor screen of another communication apparatus connected to the communication apparatus 100. The input unit 204 and the output unit 205 may be implemented by a single module, such as a touch panel. The input unit 204 and the output unit 205 each may be a member integral with or separate from the communication apparatus 100. The output unit 205 implements a function as a notification unit for making a notification to the user by providing display on-screen, sound output from the speaker, and/or vibration output. For example, as the input unit 204, the communication apparatus 100 may include hardware keys and/or a touch screen integral with the communication apparatus 100. A remote controller separate from the communication apparatus 100 may be used. For example, as the output unit 205, the communication apparatus 100 may include a monitor screen or a light source integral with the communication apparatus 100. A display and/or a speaker separate from the communication apparatus 100 may be used.

The communication unit 206 controls wireless communication compliant with the IEEE 802.11 series standard, and controls wired communication, such as wired LAN communication. The communication unit 206 controls the antenna 207 to transmit and receive wireless signals for wireless communication. In addition to or instead of the wireless communication compliant with the IEEE 802.11 series standard, the communication apparatus 100 may perform NFC based wireless communication and/or Bluetooth® based wireless communication. If the communication apparatus 100 can perform wireless communication compliant with a plurality of wireless communication standards, communication units 206 and antennas 207 corresponding to the respective wireless communications may be provided separately. The communication apparatus 100 communicates data about contents, such as image data, document data, and video data with the communication apparatuses 101 and 102 via the communication unit 206.

The communication unit 206 includes the PCR unit 211 and the WUR unit 212. The PCR unit 211 functions as a PCR defined in the IEEE 802.11ba. The WUR unit 212 functions as a WUR defined in the IEEE 802.11ba. The WUR unit 212 can operate with reduced power compared to the PCR unit 211. The communication apparatus 100 can implement a power saving function by bringing the PCR unit 211 into the doze state when not performing communication using the PCR unit 211.

The PCR unit 211 and the WUR unit 212 are configured as respective independent RF circuits. However, this is not restrictive. The PCR unit 211 and the WUR unit 212 may be configured as an integral RF circuit. In such a case, the communication apparatus 100 enables the function as the PCR unit 211 when bringing the PCR into the awake state. When bringing the PCR into the doze state, the communication apparatus 100 disables the function as the PCR unit 211. The communication apparatus 100 also performs similar control on the WUR. The RF circuit in which the PCR unit 211 and the WUR unit 212 are integrated operates with reduced power when the function as the WUR unit 212 (WUR function) is enabled, compared to when the function as the PCR unit 211 (PCR function) is enabled. The case where the PCR unit 211 according to the present exemplary embodiment is in the awake state corresponds to the state where the PCR function of the RF circuit in which the PCR unit 211 and the WUR unit 212 are integrated is enabled. The case where the WUR unit 212 according to the present exemplary embodiment is in the awake state corresponds to the state where the WUR function of the RF circuit in which the PCR unit 211 and the WUR unit 212 are integrated is enabled. In other words, if the PCR unit 211 and the WUR unit 212 are configured as an integral RF circuit and the function as the PCR unit 211 is enabled, the RF circuit itself serves as the PCR unit 211. If the PCR unit 211 and the WUR unit 212 are configured as an integral RF circuit and the function as the WUR unit 212 is enabled, the RF circuit itself serves as the WUR unit 212.

The communication apparatus 100 includes queues for storing BUs to be communicated with the communication apparatus 101 and 102 in the PCR unit 211. The communication apparatus 100 includes transmission queues for storing BUs to be transmitted and reception queues for storing BUs received from other communication apparatuses. While the communication apparatus 100 includes the transmission and reception queues in the PCR unit 211, the communication apparatus 100 may additionally or alternatively include such queues in the storage unit 201. The transmission queues and reception queues are divided by access category (AC) that is a parameter used in an enhanced distributed channel access (EDCA) mechanism defined in the IEEE 802.11 series standard. An AC is a parameter reflecting priority of transmission. There are four types of ACs: voice (VO), video (VI), best-effort (BE), and background (BK). VO has the highest priority, and the priority decreases in order of VI, BE, and BK. The transmission queues and reception queues may be divided based on other conditions, such as the destination or source communication apparatuses of the BUs, in addition to or instead of ACs.

The communication apparatuses 101 and 102 have a hardware configuration similar to that of the communication apparatus 100. However, the communication apparatuses 101 and 102 that are WUR non-AP STAs can receive but not transmit frames compliant with the IEEE 802.11ba standard in performing communication using the WUR unit 212. By contrast, the communication apparatus 100 that is a WUR AP can both transmit and receive frames compliant with the IEEE 802.11ba standard in performing communication using WUR unit 212.

Figure 3:
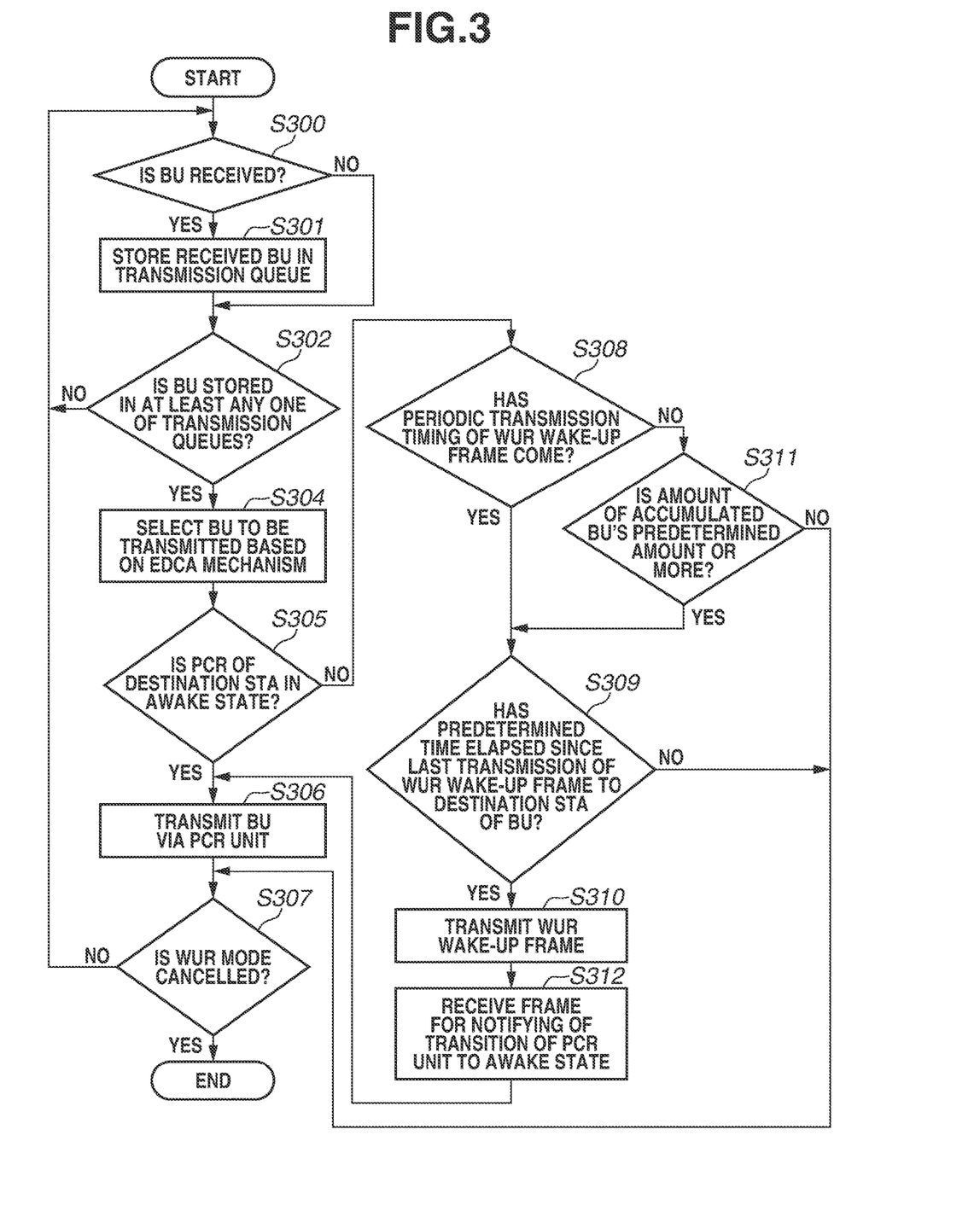
FIG. 3 is a flowchart illustrating processing that the communication apparatus 100 executes when communicating with communication apparatuses 101 and 102.

FIG. 3 is a flowchart illustrating processing implemented by the control unit 202 of the communication apparatus 100 reading a computer program stored in the storage unit 201 and executing the computer program when communicating with the communication apparatuses 101 and 102.

S300 of FIG. 3 is started if WUR mode setup processing is performed between the communication apparatuses 100 and 101 and 102 and at least either one of the communication apparatuses 101 and 102 enters the WUR mode. The WUR mode setup processing is started when the communication apparatus 101 or 102 serving as a WUR non-AP STA requests the communication apparatus 100 serving as a WUR AP to start operation in the WUR mode. If the WUR AP requested to start operation in the WUR mode by the WUR non-AP STA transmits a response indicating acceptance to the WUR non-AP STA, the WUR non-AP STA returns an ACK frame and starts to operate in the WUR mode. If the WUR AP transmits the response indicating acceptance to the WUR non-AP STA requesting the start of operation and receives the ACK frame, the WUR AP recognizes that the WUR non-AP STA is operating in the WUR mode. When operating in the WUR mode, the WUR non-AP STA can operate with reduced power by maintaining the PCR unit 211 in the doze state and the WUR unit 212 in the awake state. When the WUR non-AP STA is operating in the WUR mode, the WUR AP maintains both the PCR unit 211 and the WUR unit 212 thereof in the awake state.

In S300, the communication apparatus 100 determines whether a BU is received via the PCR unit 211. If no BU is received (NO in S300), the processing proceeds to S302. On the other hand, if a BU is received (YES in S300), the processing proceeds to S301. If the communication apparatus 100 has received data to be transmitted by PCR via a not-illustrated wired network and generated a BU from the received data, the communication apparatus 100 may make a determination of YES in this operation.

In S301, the communication apparatus 100 determines the AC of the received BU, and stores the received BU in the transmission queue corresponding to the AC of the received BU. In the present exemplary embodiment, the communication apparatus 100 includes a transmission queue for each of the ACs compliant with the EDCA mechanism. The communication apparatus 100 then determines which category the data of the received BU belongs to, VO, VI, BE, or BK, and stores the BU in the transmission queue of the corresponding category.

In S302, the communication apparatus 100 determines whether a BU is stored in at least any one of the transmission queues included in the communication apparatus 100 itself. Specifically, the communication apparatus 100 determines whether a BU is stored in at least any one of the transmission queues corresponding to VO, VI, BE, and BK. If the communication apparatus 100 determines that a BU is stored in any transmission queue, the communication apparatus 100 makes a determination of YES in S302 (YES in S302) and the processing proceeds to S304. If the communication apparatus 100 determines that no BU is stored in any of the transmission queues, the communication apparatus 100 makes a determination of NO in S302 (NO in S302) and the processing proceeds to S300.

In S304, the communication apparatus 100 selects a BU to be transmitted from among the BU(s) stored in the transmission queues based on the EDCA mechanism. Specifically, the communication apparatus 100 determines a BU of which AC to be transmitted based on parameters, such as a transmission wait time set for each AC. The communication apparatus 100 determines the AC for transmission, and selects the BU to be transmitted from among the BU(s) stored in the transmission queue corresponding to the AC. Here, VO and VI parameters are set for preferential transmission over BE and BK.

In S305, the communication apparatus 100 determines whether the PCR of the WUR non-AP STA for which the BU selected in S304 is destined (destination STA) is in the awake state. The communication apparatus 100 makes the determination based on information indicating that the PCR is in the awake state, included in the last PCR frame received from the destination WUR non-AP STA via the PCR unit 211. The frame used for the determination is not limited to a PCR frame received via the PCR unit 211 and may be such a frame as a WUR mode setup frame received via the PCR unit 211. If the information indicating that the PCR is in the awake state is included in the PCR frame or WUR mode setup frame received from the destination WUR non-AP STA, the communication apparatus 100 makes a determination of YES in this operation. On the other hand, if no information indicating that the PCR is in the awake state is included in the PCR frame or WUR mode setup frame received from the destination WUR non-AP STA, the communication apparatus 100 makes a determination of NO in this operation. The frame used for the determination may be one including information indicating that the awake state of the PCR is continued. Alternatively, the communication apparatus 100 may make a determination of YES in this operation based on reception of some kind of frame from the destination STA via the PCR unit 211. If the PCR frame or WUR mode setup frame received from the destination WUR non-AP STA includes information indicating that the PCR transitions to the doze state, the communication apparatus 100 makes a determination of NO in this operation.

The determination in this operation may be made based on whether it is within a predetermined time since the time of reception of the last PCR frame or WUR mode setup frame from the destination WUR non-AP STA of the BU via the PCR unit 211. The PCR frame or WUR mode setup frame used for the determination in this operation may or may not include the information indicating that the PCR of the destination STA is in the awake state. Any frame that is transmitted from the destination STA and received via the PCR unit 211 may be used for the determination in this operation. If it is within a predetermined time since the time of reception of the last PCR frame or WUR mode setup frame, the communication apparatus 100 determines that the PCR of the destination STA is in the awake state, and makes a determination of YES in this operation. If more than a predetermined time has elapsed since the time of reception of the last PCR frame or WUR mode setup frame, the communication apparatus 100 determines that the PCR of the destination STA is not in the awake state, and makes a determination of NO in this operation. If the determination in this operation is NO (NO in S305), the processing proceeds to S308. If the determination in this operation is YES (YES in S305), the processing proceeds to S306.

In S306, i.e., if the PCR of the destination STA is in the awake state, the communication apparatus 100 transmits the BU selected in S304 via the PCR unit 211 of the communication apparatus 100. Here, the PCR unit 211 of the communication apparatus 100 transmits the BU based on a PCR operation enabled between the communication apparatus 100 and the destination STA. Examples of the PCR operation include an active mode and a power save (PS) mode defined in the IEEE 802.11 series standard. In the PS mode, communication apparatuses operate with reduced power compared to the active mode. If the PS mode is activated between the communication apparatus 100 and the destination STA, the communication apparatus 100 that is the WUR AP initially transmits a frame including information indicating that a BU destined for the STA is stored to the destination STA. Specifically, the communication apparatus 100 transmits a beacon frame with a flag set on a traffic indication map (TIM) to the destination STA. The communication apparatus 100 then transmits the BU in response to reception of a PS-Poll frame from the destination STA having received the beacon frame. Alternatively, the communication apparatus 100, even when operating in the PS mode, may skip the transmission of the beacon frame and the reception of the PS-Poll frame in this operation and transmit the BU to the destination STA.

In S307, the communication apparatus 100 determines whether the WUR mode of the communication apparatus 100 itself is cancelled. The determination is made based on whether the communication apparatus 100 serving as the WUR AP and the WUR non-AP STA have teared down the WUR mode. Specifically, if the communication apparatus 100 serving as the WUR AP has received a WUR mode teardown frame from the WUR non-AP STA, the communication apparatus 100 determines that the WUR mode is cancelled, and makes a determination of YES in this operation. If the communication apparatus 100 has received no WUR mode teardown frame from the WUR non-AP STA, the communication apparatus 100 determines that the WUR mode is not cancelled, and makes a determination of NO in this operation. Alternatively, if the communication apparatus 100 serving as the WUR AP has transmitted a WUR mode teardown frame to the WUR non-AP STA, the communication apparatus 100 may determine that the WUR mode is cancelled, and make a determination of YES in this operation. If the communication apparatus 100 has transmitted no WUR mode teardown frame to the WUR non-AP STA, the communication apparatus 100 may determine that the WUR mode is not cancelled, and make a determination of NO in this operation.

The communication apparatus 100 may make the determination of this operation based on whether the WUR non-AP STA for which the BU is destined has transitioned from the WUR mode to a WUR mode suspend. If the communication apparatus 100 receives a request for transition to the WUR mode suspend from the destination STA and transmits a response indicating acceptance as a response to the request, the destination STA transitions to the WUR mode suspend. Entering the WUR mode suspend, the WUR non-AP STA can make the WUR unit 212 thereof transition to the doze state. The WUR non-AP STA having transitioned to the WUR mode suspend can no longer receive a WUR wake-up frame transmitted from the WUR AP. If the WUR non-AP STA has transitioned from the WUR mode to the WUR mode suspend, the communication apparatus 100 makes a determination of YES in this operation. If the WUR non-AP STA has not transitioned from the WUR mode to the WUR mode suspend, the communication apparatus 100 makes a determination of NO in this operation.

The communication apparatus 100 may make the determination of this operation based on whether the communication function or power of the communication apparatus 100 is turned off. If the communication function or power of the communication apparatus 100 is not turned off, the communication apparatus 100 makes a determination of NO in this operation. If the communication function or power of the own apparatus is turned off, the communication apparatus 100 makes a determination of YES in this operation.

If the determination in S307 is NO (NO in S307), the processing proceeds to S300. If the determination in S307 is YES (YES in S307), the processing of the present flowchart ends.

If the processing of the present flowchart ends with the WUR non-AP STA having transitioned to the WUR mode suspend, the communication apparatus 100 starts the processing of the flowchart illustrated in FIG. 3 based on a transition of the WUR non-AP STA from the WUR mode suspend to the WUR mode. When transitioning from the WUR mode suspend to the WUR mode, the WUR non-AP STA notifies the WUR AP of the transition to the WUR mode. The WUR AP having received the notification transmits a response indicating acceptance to the WUR non-AP STA. Having received the response indicating acceptance, the WUR non-AP STA returns an ACK frame and starts to operate in the WUR mode. If the WUR AP transmits the response indicating the acceptance to the WUR non-AP STA and receives an ACK frame, the WUR AP starts the processing of the flowchart illustrated in FIG. 3.

In S305, if the communication apparatus 100 determines that the PCR of the destination STA of the selected BU is not in the awake state (NO in S305), the processing proceeds to S308. In S308, the communication apparatus 100 determines whether transmission timing of a WUR wake-up frame has come. If periodic transmission timing of a WUR wake-up frame has come, the communication apparatus 100 makes a determination of YES in this operation (YES in S308) and the processing proceeds to S309. If the periodic transmission timing of a WUR wake-up frame has not come, the communication apparatus 100 makes a determination of NO in this operation (NO in S308) and the processing proceeds to S311. The period of the transmission timing of a WUR wake-up frame has a value of, e.g., 1 sec to 100 sec. The period of the transmission timing of a WUR wake-up frame may be set by the user or preset in the communication apparatus 100.

If the communication apparatus 100 performs the WUR mode setup processing with a plurality of WUR non-AP STAs, the communication apparatus 100 may transmit WUR wake-up frames to each of the WUR non-AP STAs at equal intervals. The communication apparatus 100 may simultaneously transmit a WUR wake-up frame to all the WUR non-AP STAs. Alternatively, the communication apparatus 100 may transmit WUR wake-up frames to each of the WUR non-AP STAs at different intervals. In such a case, the transmission intervals of the WUR wake-up frames may be determined, for example, by taking into account the battery capacities of the WUR non-AP STAs. WUR wake-up frames to WUR non-AP STAs having smaller battery capacities may be transmitted at longer intervals.

The communication apparatus 100 may determine the transmission intervals of WUR wake-up frames AC by AC. In such a case, the higher the priority of the AC, the shorter intervals the communication apparatus 100 may transmit WUR wake-up frames at. For example, the transmission intervals of WUR wake-up frames may be determined to be 10 msec for VO, 100 msec for VI, 1 sec for BE, and 10 sec for BK.

By performing the processing of this operation, the communication apparatus 100 can prevent BUs stored in a transmission queue corresponding to a certain priority level (AC) from being discarded due to overflowing of the transmission queue or from increasing in transmission delay.

If the communication apparatus 100 does not transmit a WUR wake-up frame at predetermined intervals, the communication apparatus 100 may skip the process of S308 and perform the process of S311 instead. Whether or not the communication apparatus 100 transmits a WUR wake-up frame at predetermined intervals can be switched by a user setting.

In S309, the communication apparatus 100 determines whether a predetermined time has elapsed since the last transmission of a WUR wake-up frame to the destination WUR non-AP STA of the BU selected in S304. If the communication apparatus 100 determines that a predetermined time has elapsed since the transmission of the WUR wake-up frame to the destination STA (YES in S309), the processing proceeds to S310. If the communication apparatus 100 determines that a predetermined time has not elapsed since the transmission of the WUR wake-up frame to the destination STA (NO in S309), the processing proceeds to S307. By performing the processing of this operation, the communication apparatus 100 can avoid frequently transmitting a wake-up frame to the same WUR non-AP STA, and can improve the use efficiency of the communication band. The power saving performance of the destination STA can also be improved by not bringing the PCR of the destination STA into the awake state frequently.

The communication apparatus 100 may skip S309. In such a case, if the determination in S308 or in S311 to be described below is YES (YES in S308 or YES in S311), the processing proceeds to S310.

If the determination in S309 is YES (YES in S309), the processing proceeds to S310. In S310, the communication apparatus 100 transmits a WUR wake-up frame to the destination WUR non-AP STA of the BU selected in S304 via the WUR unit 212. After the process of S310, the processing proceeds to S312. The communication apparatus 100 transmits the WUR wake-up frame during a WUR duty cycle schedule period determined by negotiation with the destination WUR non-AP STA in advance.

In S312, the communication apparatus 100 receives a frame for giving notification of transition of the PCR unit 211 to the awake state from the WUR non-AP STA to which the WUR wake-up frame is transmitted from the communication apparatus 100 in S310 as a response to the WUR wake-up frame. Specifically, the frame received in this operation is a PCR frame including information indicating that the PCR is in the awake state. The frame received in this operation may be a WUR mode setup frame including information indicating that the PCR is in the awake state, received via the PCR unit 211. The frame received in this operation may be a frame including information that the awake state of the PCR is continued. After the communication apparatus 100 receives such a notification from the WUR non-AP STA, the processing proceeds to S306. In S306, the communication apparatus 100 transmits the selected BU. In S312, the communication apparatus 100 may make a determination of YES based on the reception of some type of frame from the destination STA via the PCR unit 211. The communication apparatus 100 can receive the frame for notifying of the transition of the PCR unit 211 to the awake state from the WUR non-AP STA not necessarily in this operation but anytime during the processing of the flowchart illustrated in FIG. 3.

After the process of S312, the processing may proceed to S307, and the communication apparatus 100 may perform the process of S307. In such a case, the communication apparatus 100 makes a determination of NO in S307 (NO in S307), the processing proceeds to S300, and the communication apparatus 100 performs subsequent processes. In S304 the communication apparatus 100 may select a BU different from the previously selected one.

On the other hand, if the determination in S308 is NO (NO in S308), the processing proceeds to S311. In S311 the communication apparatus 100 determines whether the amount of BUs accumulated in the transmission queue in which the BU selected in S304 is stored is greater than or equal to a predetermined amount. If the amount of BUs accumulated in the transmission queue in which the selected BU is stored is greater than or equal to the predetermined amount, the communication apparatus 100 makes a determination of YES in S311 (YES in S311) and the processing proceeds to S309. If the amount of BUs accumulated in the transmission queue in which the selected BU is stored is not greater than or equal to the predetermined amount, the communication apparatus 100 makes a determination of NO in S311 (NO in S311) and the processing proceeds to S307. By thus selecting whether to transmit a WUR wake-up frame based on the amount of BUs accumulated in the transmission queue in which the selected BU is stored, the communication apparatus 100 can improve the use efficiency of the communication band compared to the case where a WUR wake-up frame is transmitted each time a BU is received. The communication apparatus 100 can also improve the power saving performance of the destination WUR non-AP STA of the BU. The communication apparatus 100 can further prevent a queue overflow by not only transmitting WUR wake-up frames periodically but performing aperiodic transmission of WUR wake-up frames as well. The communication apparatus 100 may set a smaller amount of accumulation as the predetermined amount for a transmission queue corresponding to an AC with high transmission priority than for a transmission queue corresponding to an AC with low transmission priority.

The communication apparatus 100 may determine whether the AC of the selected BU is a predetermined one in addition to whether the amount of BUs accumulated in the transmission queue in which the selected BU is stored is greater than or equal to the predetermined amount. If the amount of BUs accumulated in the transmission queue in which the selected BU is stored is greater than or equal to the predetermined amount and the AC of the selected BU is a predetermined one, the communication apparatus 100 makes a determination of NO in S311. The communication apparatus 100 can thus further improve the use efficiency of the communication band by making a determination based on the combination of the two conditions. The power saving performance of the destination STA of the BU can also be improved further.

The information that the communication apparatus 100 uses in making the determination of S311 is stored in the storage unit 201 of the communication apparatus 100. Alternatively, the information may be obtained via the input unit 204 or the communication unit 206.

Figure 4:
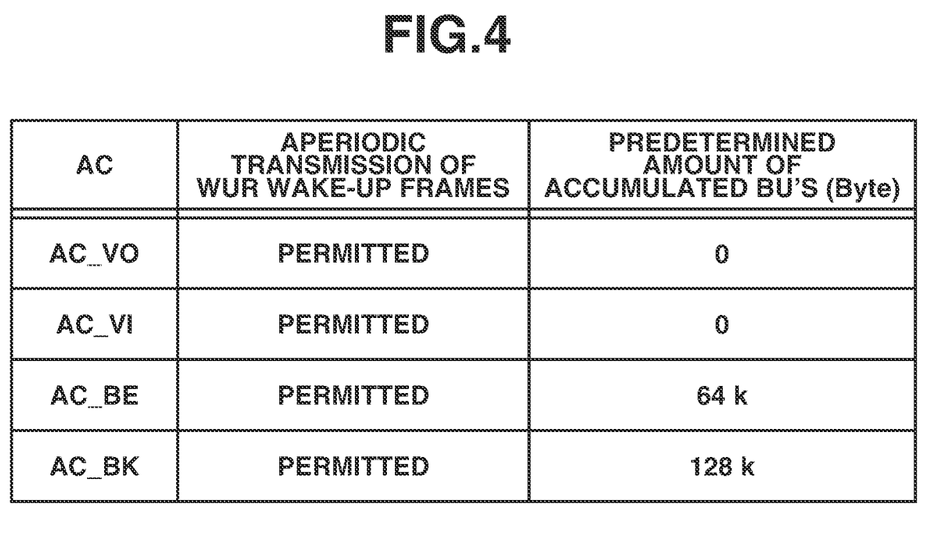
FIG. 4 illustrates an example of information that the communication apparatus 100 uses in making a determination in S311 of FIG. 3.

FIG. 4 illustrates an example of information that the communication apparatus 100 uses in making the determination in S311. The information illustrated in FIG. 4 includes settings about the predetermined amounts of BUs accumulated in the respective transmission queues corresponding to VO, VI, BE, and BK. In S311, if the amount of BUs accumulated in the transmission queue in which the selected BU is stored is greater than or equal to the predetermined amount, the communication apparatus 100 makes a determination of YES. If the amount of BUs accumulated is not greater than or equal to the predetermined amount, the communication apparatus 100 makes a determination of NO.

Figure 5:
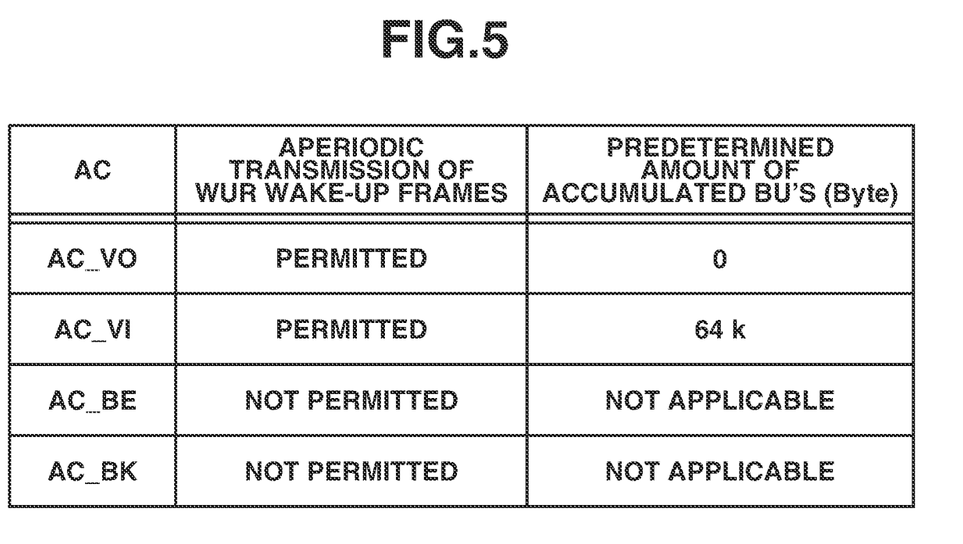
FIG. 5 illustrates another example of the information that the communication apparatus 100 uses in making a determination in S311 of FIG. 3.

FIG. 5 illustrates another example of the information that the communication apparatus 100 uses in making the determination of S311. In such a case, the communication apparatus 100 makes the determination based on the amount of BUs accumulated in the transmission queue in which the selected BU is stored and the AC of the selected BU. The information illustrated in FIG. 5 does not permit the aperiodic transmission of WUR wake-up frames for BUs having an AC of BE or BK. If the transmission queue in which the selected BU is stored is one corresponding to BE or BK and the amount of accumulation is greater than or equal to the predetermined amount, the communication apparatus 100 therefore makes a determination of NO in S311. In such a case, the communication apparatus 100 does not need to set a predetermined amount of accumulation for the transmission queues corresponding to the ACs in which the aperiodic transmission of WUR wake-up frames is not permitted, as illustrated in FIG. 5.

If the transmission queue corresponding to the AC of the BU selected in S304 contains BUs destined for different STAs, the communication apparatus 100 may perform the process of S305 and subsequent operations on all the destination STAs. The communication apparatus 100 then may transmit a WUR wake-up frame to all the STAs for which a determination of YES is made in S309. If the communication apparatus 100 performs the process of S310 and receives a notification that the PCR is in the awake state from each of the STAs, the communication apparatus 100 transmits the BUs stored in the transmission queue to the respective destination STAs. The processes of S310, S312, and S306 may not be performed on an STA or STAs for which a predetermined time has not elapsed since the previous transmission of a WUR wake-up frame among the destination STAs of the BUs stored in the transmission queue.

The flowchart illustrating the processing that the communication apparatus 100 executes when communicating with the communication apparatuses 101 and 102 has been described above with reference to FIG. 3. By selecting whether to transmit a WUR wake-up frame to the destination STA based on the amount of BUs accumulated in the transmission queue in which the received BU is stored, the communication apparatus 100 can improve the use efficiency of the communication band compared to the case where a WUR wake-up frame is transmitted each time a BU is received. The power saving performance of the WUR non-AP STA for which the BU is destined can also be improved. The communication apparatus 100 can also prevent a queue overflow by not only transmitting WUR wake-up frames periodically but performing aperiodic transmission of WUR wake-up frames as well.

In the present exemplary embodiment, the communication apparatus 100 is described to store the BU received in S300 in a transmission queue. However, this is not restrictive. The communication apparatus 100 may store BUs including data generated by the functional unit 203 in a transmission queue. The communication apparatus 100 may store BUs including data generated based on data input to the input unit 204 into a transmission queue. The communication apparatus 100 may perform the process of S304 and subsequent operations on such BUs.

In the present exemplary embodiment, the communication apparatus 100 is described to receive BUs including AC information. However, this is not restrictive. The communication apparatus 100 may receive BUs including no AC information. If such a BU is received, the communication apparatus 100 transmits the BU to the destination STA on a priority basis. In such a case, the communication apparatus 100 includes a transmission queue or reception queue for storing BUs including no AC information. Specifically, if a BU including no AC information is received in S300 (YES in S300), the processing proceeds to S301. In S301, the communication apparatus 100 stores the received BU in a transmission queue intended for BUs including no AC information. The communication apparatus 100 makes a determination of YES in S302 (YES in S302), and the processing proceeds to S304. In S304, the communication apparatus 100 selects the received BU as the BU to be transmitted. If, in S305, it is determined that the PCR of the destination STA is in the awake state (YES in S305), the processing proceeds to S306 and the communication apparatus 100 performs the process of S306. If, in S305, it is determined that the PCR of the destination STA is not in the awake state (NO in S305), the processing proceeds to S308. If the communication apparatus 100 transmits a BU including no AC information and the determination in S305 is NO, the processing may proceed to S310.

The communication apparatus 100 may transmit BUs including AC information with a higher priority than BUs including no AC information. The communication apparatus 100 may transmit BUs including no AC information with a higher priority than BUs including information about a specific AC or ACs. For example, the communication apparatus 100 may transmit BUs including no AC information with a higher priority than BUs including AC information about BK and BE, but after BUs including AC information about VO and VI.

The communication apparatus 100 may process a BU including no AC information in association with an appropriate AC. In such a case, the communication apparatus 100 associates the BU including no AC information with an appropriate AC based on information indicating the contents of the BU. The communication apparatus 100 may process all the BUs including no AC information in association with a specific AC in a uniform manner.

Figure 6:
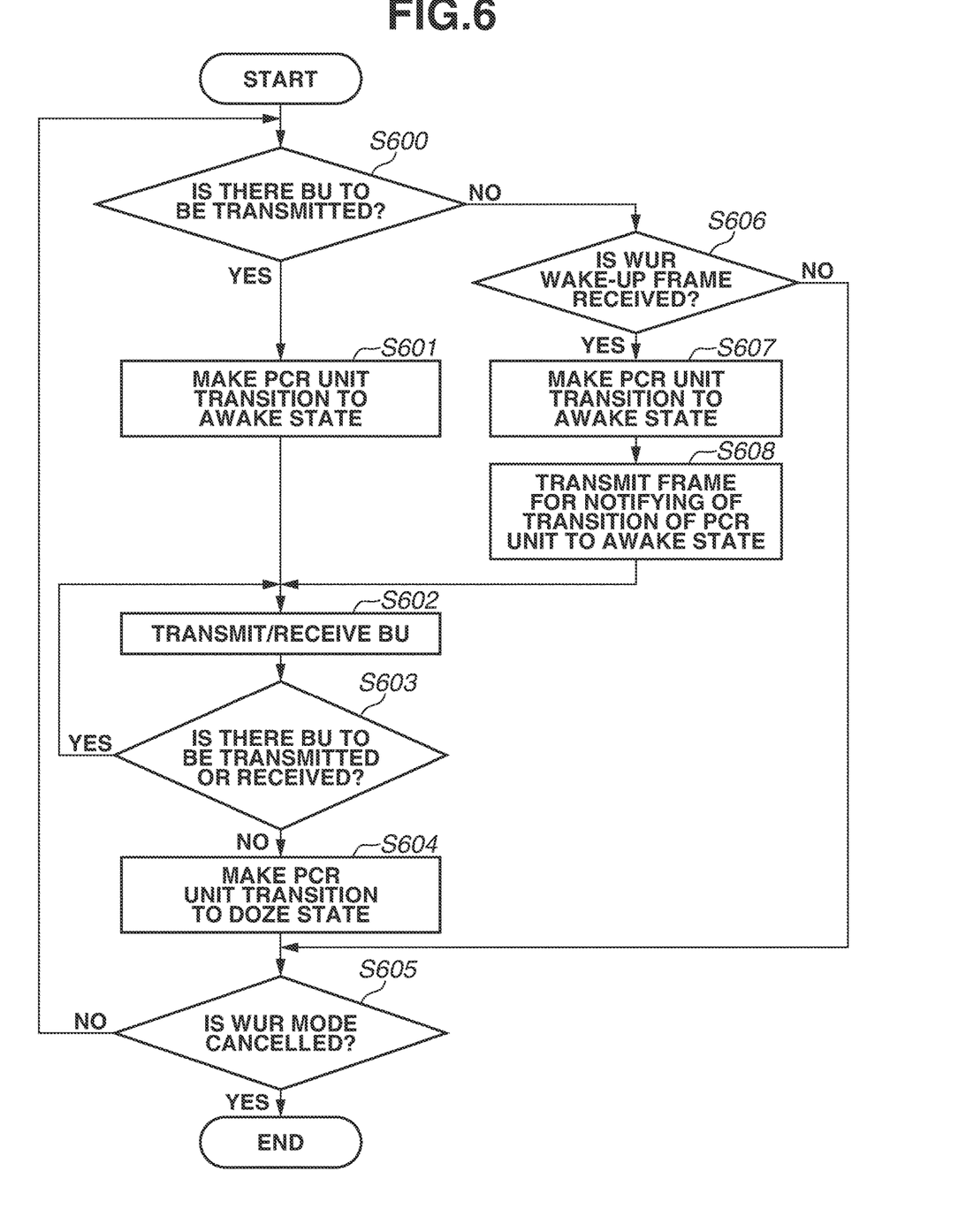
FIG. 6 is a flowchart illustrating processing that the communication apparatus 101 or 102 executes when communicating with the communication apparatus 100.

FIG. 6 is a flowchart illustrating processing implemented by the control unit 202 of the communication apparatus 101 or 102 reading a computer program stored in the storage unit 201 and executing the program when communicating with the communication apparatus 100.

S600 of FIG. 6 is started if the communication apparatuses 100, 101, and 102 perform the WUR mode setup processing therebetween and the communication apparatuses 101 and 102 enter the WUR mode. The WUR mode setup processing is started by the communication apparatuses 101 and 102 that are WUR non-AP STAs requesting the communication apparatus 100 that is the WUR AP to start operation in the WUR mode. The WUR AP transmits a response indicating acceptance to the WUR non-AP STAs requesting the start of operation in the WUR mode. Having received the response indicating acceptance, the WUR non-AP STAs start to operate in the WUR mode. In operating in the WUR mode, the WUR non-AP STAs can operate with reduced power by maintaining their PCR in the doze state and their WUR in the awake state. In the present exemplary embodiment, the present flowchart will be described by using the communication apparatus 101 as an example.

In S600, the communication apparatus 101 determines whether there is a BU to be transmitted to another communication apparatus in a transmission queue of the communication apparatus 101. The BU may be data generated by the functional unit 203 or data generated based on data input to the input unit 204. The BU includes information indicating an AC. If there is no BU to be transmitted, the communication apparatus 101 makes a determination of NO (NO in S600) and the processing proceeds to S606. If there is a BU to be transmitted, the communication apparatus 101 makes a determination of YES (YES in S600) and the processing proceeds to S601.

In S601, the communication apparatus 101 makes the PCR unit 211 having been in the doze state transition to the awake state. Here, the communication apparatus 101 may transmit a frame for notifying the WUR AP of the transition of the PCR unit 211 to the awake state.

In S602, the communication apparatus 101 transmits or receives a BU to/from the communication apparatus 100 via the PCR unit 211 having transitioned to the awake state. If the process of S602 is performed subsequent to S601, the communication apparatus 101 transmits the BU. In this operation, the communication apparatus 101 transmits or receives a BU based on the enabled PCR operation.

In S603, the communication apparatus 101 determines whether there still is a BU to be transmitted or received. If there is a BU to be transmitted, the communication apparatus 101 makes a determination of YES in this operation (YES in S603) and the processing proceeds to S602. In such a case, the communication apparatus 101 transmits the BU in S602. Whether or not there is a BU to be received is determined based on the PCR operation enabled between the communication apparatus 101 and the WUR AP. For example, if the PS mode is enabled between the communication apparatus 101 and the WUR AP, the communication apparatus 101 makes a determination of YES in this operation based on reception of a frame that is transmitted from the WUR AP and includes information indicating that the WUR AP transmits a BU to the communication apparatus 101. In such a case, the communication apparatus 101 receives the BU transmitted from the WUR AP as the process of S602. If the active mode is enabled in the communication apparatus 101, the communication apparatus 101 may make a determination of YES in this operation (YES in S603) and wait for a BU from the WUR AP for a predetermined time in S602. If the communication apparatus 101 has waited for a predetermined time or a predetermined number of times of operations in S602, the communication apparatus 101 may make a determination of NO in S603. If there is no BU to be transmitted or received, the communication apparatus 101 makes a determination of NO in this operation (NO in S603) and the processing proceeds to S604.

In S604, the communication apparatus 101 transitions the PCR unit 211 to the doze state. Before transitioning the PCR unit 211 to the doze state, the communication apparatus 101 may notify the communication apparatus 100 that the PCR unit 211 of the communication apparatus 101 is to transition to the doze state. The communication apparatus 101 may make the notification by using a PCR frame or by using a WUR mode setup frame transmitted via the PCR unit 211. The communication apparatus 101 may make the notification by using other frames compliant with the IEEE 802.11 series standard.

In S605, the communication apparatus 101 with the PCR unit 211 having transitioned to the doze state determines whether the WUR mode is cancelled. The communication apparatus 101 makes the determination based on whether an instruction to cancel the WUR mode is given from the user. If the instruction to cancel the WUR mode is given from the user, the communication apparatus 101 makes a determination of YES in this operation. If not, the communication apparatus 101 makes a determination of NO in this operation. Alternatively, the communication apparatus 101 makes the determination of this operation based on whether the WUR AP and the communication apparatus 101 that is the WUR non-AP STA have teared down the WUR mode. Specifically, if the communication apparatus 101 that is the WUR non-AP STA has transmitted a WUR mode teardown frame, the communication apparatus 101 determines that the WUR mode is cancelled, and makes a determination of YES in this operation. If the communication apparatus 101 has transmitted no WUR mode teardown frame, the communication apparatus 101 determines that the WUR mode is not cancelled, and makes a determination of NO in this operation. Alternatively, if the communication apparatus 101 has received a WUR mode teardown frame, the communication apparatus 101 may determine that the WUR mode is cancelled, and make a determination of YES in this operation. If the communication apparatus 101 has received no WUR mode teardown frame, the communication apparatus 101 may determine that the WUR mode is not cancelled, and make a determination of NO in this operation.

The communication apparatus 101 may make the determination of this operation based on whether the communication apparatus 101 has transitioned from the WUR mode to the WUR mode suspend. Having entered the WUR mode suspend, the communication apparatus 101 makes the WUR unit 212 thereof transition to the doze state. If the communication apparatus 101 has transitioned to the WUR mode suspend, the communication apparatus 101 makes a determination of YES in this operation. If the communication apparatus 101 has not transitioned to the WUR mode suspend, the communication apparatus 101 makes a determination of NO in this operation.

The communication apparatus 101 may make the determination of this operation based on whether the communication function or power of the own apparatus is turned off. If the communication function or power of the communication apparatus 101 is not turned off, the communication apparatus 101 makes a determination of NO in this operation. If the communication function or power of communication apparatus 101 is turned off, the communication apparatus 101 makes a determination of YES in this operation.

If the determination in S605 is NO (NO in S605), the processing proceeds to S600. If the determination in S605 is YES (YES in S605), the processing of the present flowchart ends.

If the processing of the present flowchart ends with the communication apparatus 101 having transitioned to the WUR mode suspend, the communication apparatus 101 starts the processing of the flowchart illustrated in FIG. 6 based on a transition from the WUR mode suspend to the WUR mode. When transitioning from the WUR mode suspend to the WUR mode, the WUR non-AP STA notifies the WUR AP of the transition to the WUR mode. Having received the notification, the WUR AP returns a response indicating acceptance to the WUR non-AP STA. In response to receiving the response indicating acceptance from the WUR AP, the WUR non-AP STA transitions to the WUR mode, and starts the processing of the flowchart illustrated in FIG. 6.

In S600, if the communication apparatus 101 determines that there is no BU to be transmitted (NO in S600), the processing proceeds to S606. In S606, the communication apparatus 101 determines whether a WUR wake-up frame is received via the WUR unit 212. If it is determined that no WUR wake-up frame is received, the communication apparatus 101 makes a determination of NO in this operation (NO in S606) and the processing proceeds to S605. If it is determined that a WUR wake-up frame is received, the communication apparatus 101 makes a determination of YES in this operation (YES in S606) and the processing proceeds to S607.

In S607, the communication apparatus 100 transitions the PCR unit 211 to the awake state, as in S601.

In S608, the communication apparatus 101 transmits a frame for notifying the communication apparatus 100 of the transition of the PCR unit 211 to the awake state as a response to the WUR wake-up frame. This frame may be any frame. Examples include a null data packet (NDP). The frame transmitted in this operation may be one including information indicating that the awake state of the PCR is continued. After the process of S608, the processing proceeds to S602. In S602, the communication apparatus 101 receives a BU.

The flowchart illustrating the processing that the communication apparatus 101 or 102 executes when communicating with the communication apparatus 100 has been described above with reference to FIG. 6.

In the present exemplary embodiment, the transmission queues and reception queues are provided for the respective ACs. However, this is not restrictive. Transmission queues and reception queues may be provided for respective priority levels of BUs determined by using other EDCA parameters. Examples of the other EDCA parameters include CWmin, CWmax, arbitration interframe space (AIFS), and a transmission opportunity (TXOP) limit. CWmin represents a minimum value of a contention window (CW), i.e., a minimum value of a transmission wait time. CWmax represents a maximum value of the CW, i.e., a maximum value of the transmission wait time. The smaller the values of CWmin and CWmax, the higher the priority. AIFS is information indicating a frame transmission interval. The shorter the frame transmission interval indicated by AIFS, the higher the priority. TXOP refers to a channel occupation time. The higher the TXOP limit, the more frames can be transmitted at a time. The smaller the value of the TXOP limit, the lower the priority. The priority may be determined based on other parameters defined in the IEEE 802.11 series standard. The priority may be determined based on information originally defined by the user. Such information may be included in a payload, a vendor specific area, or a reserved area of a BU.

In the present exemplary embodiment, whether or not to transmit a WUR wake-up frame is determined based on the amount of BUs accumulated in the transmission queue in which the received BU is stored. The communication apparatus 100 may alternatively or additionally determine whether to transmit a WUR wake-up frame based on the total amount of BUs accumulated in all the transmission queues. This can prevent the BUs stored in any transmission queue from being discarded due to an overflow of the transmission queue.

At least part or all of the flowcharts for the communication apparatuses 100, 101, and 102 illustrated in FIGS. 3 and 6 may be implemented by hardware. For hardware implementation, for example, a dedicated circuit generated on a field programmable gate array (FPGA) from the computer programs for implementing the operations by using a predetermined complier may be used. As in an FPGA, a gate array circuit may be formed for hardware implementation. An application specific integrated circuit (ASIC) may be used for hardware implementation.

While an exemplary embodiment has been described above in detail, some exemplary embodiments may include, for example, a system, an apparatus, a method, a program, and a recording medium (storage medium). For example, some embodiments may be applied to a system including a plurality of devices (e.g., a host computer, an interface device, an imaging apparatus, and a web application), or an apparatus including a single device.

Some exemplary embodiments can be implemented by processing for supplying a program for implementing one or more of the functions of the foregoing exemplary embodiment to a system or an apparatus via a network or a storage medium, and reading and executing the program by one or more processors in a computer of the system or apparatus. A circuit for implementing one or more functions (for example, ASIC) may be used for implementation.

According to some exemplary embodiments, the use efficiency of a communication band can be improved.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-210839, which was filed on Nov. 8, 2018 and which is hereby incorporated by reference herein in its entirety.

What is claimed is:

1. A communication apparatus comprising:
    a first communication unit compliant with an Institute of Electrical and Electronics Engineers (IEEE) 802.11 series standard;
    a second communication unit compliant with the IEEE 802.11 series standard, the second communication unit having power consumption lower than that of the first communication unit;
    one or more processors; and
    one or more memories including instructions that, when executed by the one or more processors, cause the communication apparatus to:
    store, in a first transmission queue, data to be transmitted to another communication apparatus via the first communication unit;
    in a case where the data stored is to be transmitted to the other communication apparatus including a third communication unit and a fourth communication unit via the first communication unit, select whether to transmit a frame for causing a transition to a state where communication is performable via the third communication unit, based on an amount of data accumulated in the first transmission queue in which the data is stored the third communication unit compliant with the IEEE 802.11 series standard, and the fourth communication unit compliant with the IEEE 802.11 series standard and having power consumption lower than that of the third communication unit,
    wherein transmitting of the frame for causing the transition to the state where communication is performable via the third communication unit is selected in a case where the amount of data accumulated in the first transmission queue is greater than or equal to a first predetermined amount, and
    wherein not transmitting of the frame for causing the transition to the state where communication is performable via the third communication unit is selected in a case where the amount of data accumulated in the first transmission queue is not greater than or equal to the first predetermined amount; and transmit the frame for causing the transition to the state where communication is performable via the third communication unit to the other communication apparatus via the second communication unit based on a selection made by the selecting.

2. A communication apparatus comprising:

a first communication unit compliant with an Institute of Electrical and Electronics Engineers (IEEE) 802.11 series standard;

a second communication unit compliant with the IEEE 802.11 series standard, the second communication unit having power consumption lower than that of the first communication unit;

one or more processors; and one or more memories including instructions that, when executed by the one or more processors, cause the communication apparatus to:

store, in a first transmission queue, data to be transmitted to another communication apparatus via the first communication unit and store data having lower priority than that of the data into a second transmission queue different from the first transmission queue;

in a case where the data stored is to be transmitted to the other communication apparatus including a third communication unit and a fourth communication unit via the first communication unit, select whether to transmit a frame for causing a transition to a state where communication is performable via the third communication unit, based on an amount of data accumulated in the first transmission queue in which the data is stored, the third communication unit compliant with the IEEE 802.11 series standard, and the fourth communication unit compliant with the IEEE 802.11 series standard and having power consumption lower than that of the third communication unit, wherein transmitting of the frame for causing the transition to the state where communication is performable via the third communication unit is selected in a case where an amount of data accumulated in the second transmission queue is greater than or equal to a second predetermined amount greater than the first predetermined amount, and, wherein not transmitting of the frame for causing the transition to the state where communication is performable via the third communication unit is selected in a case where the amount of data accumulated in the second transmission queue is not greater than or equal to the second predetermined amount; and transmit the frame for causing the transition to the state where communication is performable via the third communication unit to the other communication apparatus via the second communication unit based on a selection made by the selecting.

3. The communication apparatus according to claim 1, wherein the one or more memories further include instructions that, when executed by the one or more processors, cause the communication apparatus to: transmit the frame for causing the transition to the state where communication is performable via the third communication unit to the other communication apparatus in a predetermined period; and make a selection in a case where the predetermined period has not come and the data is to be transmitted.

4. The communication apparatus according to claim 1, wherein the one or more memories further include instructions that, when executed by the one or more processors, cause the communication apparatus to: make a selection in a case where a predetermined time has elapsed since last transmission of the frame for causing the transition to the state where communication is performable via the third communication unit to the other communication apparatus, and select not transmitting of the frame for causing the transition to the state where communication is performable via the third communication unit in a case where the predetermined time has not elapsed.

5. The communication apparatus according to claim 1, wherein the one or more memories further include instructions that, when executed by the one or more processors, cause the communication apparatus to:

receive, from the other communication apparatus, a notification that communication via the third communication unit is performable in a case where the frame for causing the transition to the state where communication is performable via the third communication unit is transmitted by the transmitting; and transmit the data to the other communication apparatus via the first communication unit based on reception of the notification by the receiving.

6. The communication apparatus according to claim 1, wherein a priority of the data is based on an enhanced distributed channel access (EDCA) parameter of the data.

7. The communication apparatus according to claim 6, wherein the priority of the data is an access category (AC) and is at least one of voice (VO), video (VI), best effort (BE), and background (BK).

8. The communication apparatus according to claim 1, wherein the first and third communication units are primary connectivity radios (PCRs) defined in an IEEE 802.11ba standard, and wherein the second and fourth communication units are wake-up radios (WURs) defined in the IEEE 802.11ba standard.

9. The communication apparatus according to claim 1, wherein the frame for causing the transition to the state where communication is performable via the third communication unit is a WUR wake-up frame compliant with an IEEE 802.11ba standard.

10. A control method for a communication apparatus including a first communication unit compliant with an IEEE 802.11 series standard and a second communication unit compliant with the IEEE 802.11 series standard, the second communication unit having power consumption lower than that of the first communication unit, the control method comprising:

storing, in a first transmission queue, data to be transmitted to the other communication apparatus via the first communication unit;

selecting, in a case where the data stored in the storing is to be transmitted to another communication apparatus including a third communication unit and a fourth communication unit via the first communication unit, whether to transmit a frame for causing a transition to a state where communication is performable via the third communication unit, based on an amount of data accumulated in the first transmission queue in which the data is stored in the storing, the third communication unit compliant with the IEEE 802.11 series standard, and the fourth communication unit compliant with the IEEE 802.11 series standard and having power consumption lower than that of the third communication unit, wherein the selecting selects transmitting of the frame for causing the transition to the state where communication is performable via the third communication unit in a case where the amount of data accumulated in the first transmission queue is greater than or equal to a first predetermined amount, and selects not transmitting of the frame for causing the transition to the state where communication is performable via the third communication unit in a case where the amount of data accumulated in the first transmission queue is not greater than or equal to the first predetermined amount; and transmitting the frame for causing the transition to the state where communication is performable via the third communication unit to the other communication apparatus via the second communication unit based on a selection made in the selecting.

11. A non-transitory computer-readable storage medium storing a computer program for causing a computer to execute a control method of a communication apparatus including a first communication unit compliant with an IEEE 802.11 series standard and a second communication unit compliant with the IEEE 802.11 series standard, the second communication unit having power consumption lower than that of the first communication unit, the control method comprising:

storing, in a first transmission queue, data to be transmitted to the other communication apparatus via the first communication unit;

selecting, in a case where the data stored in the storing is to be transmitted to another communication apparatus including a third communication unit and a fourth communication unit via the first communication unit, whether to transmit a frame for causing a transition to a state where communication is performable via the third communication unit, based on an amount of data accumulated in the first transmission queue in which the data is stored in the storing, the third communication unit compliant with the IEEE 802.11 series standard, and the fourth communication unit compliant with the IEEE 802.11 series standard and having power consumption lower than that of the third communication unit, wherein the selecting selects transmitting of the frame for causing the transition to the state where communication is performable via the third communication unit in a case where the amount of data accumulated in the first transmission queue is greater than or equal to a first predetermined amount, and selects not transmitting of the frame for causing the transition to the state where communication is performable via the third communication unit in a case where the amount of data accumulated in the first transmission queue is not greater than or equal to the first predetermined amount; and transmitting the frame for causing the transition to the state where communication is performable via the third communication unit to the other communication apparatus via the second communication unit based on a selection made in the selecting.

* * * * *